Patented Dec. 17, 1946

2,412,790

UNITED STATES PATENT OFFICE 2,412,790

DYESTUFFS OF THE ANTHRAQUINONE SERIES AND A PROCESS OF MAKING SAME

Samuel von Allmen and Hans Eggenberger, Basel, Switzerland, assignors to Sandoz Ltd., Fribourg, Switzerland No Drawing. Application June 20, 1944, Serial No. 541,288. In Switzerland July 16, 1943

7 Claims. (Cl. 260—372)

The present invention relates to new dyestuffs of the anthraquinone series possessing an improved stability to artificial light and to a process for their preparation.

It is known that the dyestuffs of the anthraquinone series containing in their molecule the radical of an aromatic amine corresponding to the general formula

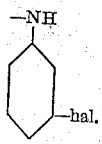

wherein hal. stands for bromine or chlorine, possess a much redder shade than the corresponding isomers containing the halogen in p-position to the amino group. The m-substituted compounds are known as being valuable violet acid dyestuffs (cf. U. S. Patent No. 1,898,861, Example 6).

It is further known that the dyestuffs of the group corresponding to the general formula

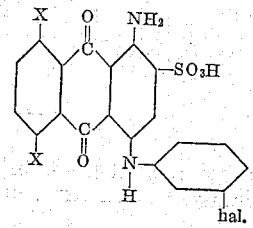

wherein one of the X represents a sulphonic acid group, the other X being hydrogen, give reddish-blue shades which change to red in artificial light (cf. U. S. Patent No. 1,898,861, Example 6).

It has now been found that the dyestuffs corresponding to the general formula

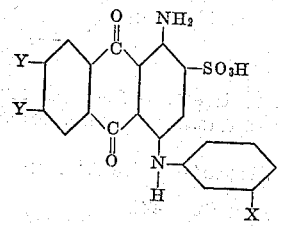

wherein one of the Y stands for a sulphonic acid group, the other Y being hydrogen and wherein X stands for a substituent selected from the group consisting of halogen, COOH, alkyl, COOR, OH, OR, R meaning an alkyl group, possess unexpected fastness to artificial light, so that the same are very suitable for dyeing and printing animal fibres.

The process for the manufacture of these new dyestuffs consists in condensing, in an aqueous or organic solvent or in a mixture thereof at temperatures between 50° and 150° C., a 1-amino-2:4-dihalogenanthraquinone-6- or -7-sulphonic acid with a meta-substituted aniline corresponding to the general formula

wherein X stands for a substituent selected from the group consisting of halogen, COOH, alkyl, COOR, OH, OR, R meaning an alkyl group, in presence of copper or of a copper compound and of an acid binding agent, and by subsequently treating the monosulphonated dyestuffs thus obtained with sulphites in order to substitute the halogen atom by a sulphonic acid group.

The same dyestuffs can also be prepared by condensing 1-amino-4-halogenanthraquinone-2:6- or -2:7-disulphonic acid with a meta-substituted aniline under the above-described condensation conditions.

As amines used for the manufacture of the new dyestuffs may be cited for instance meta-toluidine, meta-chloraniline, meta-bromaniline, meta-aminobenzoic acid, meta-ethylaniline, meta-aminobenzoic acid methyl ester, meta-aminophenol, meta-anisidine.

As sulphonated aminohalogenanthraquinones which can be used, come into consideration, for example, 1-amino-2:4-dibromanthraquinone-6- or -7-sulphonic acid, 1-amino-2:4-dichloranthraquinone-6- or -7-sulphonic acid, 1-amino-4-bromanthraquinone-2:6- or -2:7-disulphonic acids, 1-amino-4-chloranthraquinone-2:6- or 2:7-disulphonic acids, or mixtures of the isomers.

The present invention will now be illustrated, but not limited by the following examples, wherein the parts are by weight.

Example 1

A mixture consisting of:

| | Parts |
|---|---|
| Potassium salt of 1-amino-2:4-dibromanthraquinone-6-sulphonic acid | 10 |
| Meta-toluidine | 3.2 |
| Sodium bicarbonate | 4.8 |
| Copper powder | 0.2 |
| Water | 50 |
| Ethanol | 15 | are heated under stirring during 12 hours at 80° C. During the interaction the shade of the reaction mass changes from red to blue. After the condensation the monosulphonated dyestuff is separated and heated with a solution of a sulphite, until the halogen atom has been replaced by a sulphonic acid group. The disulphonated dyestuff is then isolated in the usual way.

The new dyestuff dyes wool, silk, hairs, leather and synthetical fibres, like nylon, in beautiful blue shades which do not change in artificial light.

The new dyestuff can also be prepared by condensing 1-amino-4-bromanthraquinone-2:6-disulphonic acid with meta-toluidine. Its isomeric compound containing the sulphonic acid groups in 2:7-positions has a similar shade.

The same dyestuff can also be prepared by starting from 1-amino-4-chloranthraquinone-2:6- or -2:7-disulphonic acids.

*Example 2*

A mixture consisting of:

| | Parts |
|---|---|
| Potassium salt of 1-amino-2:4-dibromanthraquinone-7-sulphonic acid | 10 |
| Meta-chloraniline | 3.9 |
| Sodium bicarbonate | 4.8 |
| Copper powder | 0.2 |
| Water | 60 |
| Ethanol | 20 | is heated together during 20 hours at 80° C.

After the condensation, the monosulphonated dyestuff is isolated and treated as described in Example 1.

The new disulphonated dyestuff dyes animal fibres in blue-reddish shades, which remain unchanged in artificial light.

*Example 3*

A mixture consisting of:

| | Parts |
|---|---|
| Sodium salt of 1-amino-4-bromanthraquinone-2:6-disulphonic acid | 15 |
| Meta-chloraniline | 3.9 |
| Sodium bicarbonate | 4.8 |
| Copper powder | 0.2 |
| Water | 60 |
| Ethanol | 15 | is heated for several hours at 80° C. The reaction mass is then poured into diluted acid and the new dyestuff separated according to the usual methods.

It dyes animal fibres in blue-reddish shades which do not change to red, when exposed to artificial light.

*Example 4*

5.6 parts of meta-aminobenzoic acid are dissolved at 40° C. in 60 parts of water and neutralized with 3.2 parts of sodium carbonate. To this solution are added 10 parts of potassium salt of 1-amino-2:4-dibromanthraquinone-7-sulphonic acid, 0.2 part of copper powder and 10 parts of water, and the mixture is heated for 4 hours at 80° C. and a further hour at 95° C. After the condensation the mono-sulphonated dyestuff is separated and treated with a hot solution of a sulphite in the manner described in Example 1.

The disulphonated dyestuff thus obtained dyes animal fibres in beautiful blue-reddish shades, which remain unchanged in artificial light.

*Example 5*

5.6 parts of meta-aminobenzoic acid are dissolved in 60 parts of water and neutralized with 3.2 parts of sodium carbonate.

To this solution are added 13 parts of the sodium salt of 1-amino-4-chloranthraquinone-2:6-disulphonic acid and 0.2 part of copper powder, and the mixture is heated under stirring at 80° C., until the condensation has finished.

The new dyestuff thus obtained dyes animal fibres in blue-reddish shades, which remain unchanged in artificial light.

*Example 6*

By starting from 5 parts of meta-aminobenzoic acid methylester and 15 parts of the sodium salt of 1-amino-4-bromanthraquinone-2:7-disulphonic acid and working up as described in Example 3, a new dyestuff dyeing animal fibres in pure blue shades, which remain unchanged in artificial light, will be obtained.

What we claim is:

1. The new dyestuffs of the anthraquinone series of the general formula

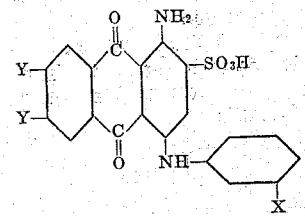

wherein one Y stands for a sulphonic acid group, the other Y being hydrogen, and wherein X stands for a substituent selected from the group consisting of halogen, alkyl, COOH, COO-alkyl, OH and O-alkyl, which dyestuffs dye animal and related fibres in blue shades which are unchanged when exposed to artificial light.

2. The new dyestuff of the formula

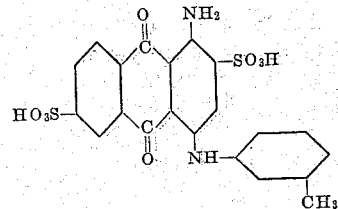

dyeing animal and related fibres in blue shades which are unchanged when exposed to artificial light.

3. The new dyestuff of the formula

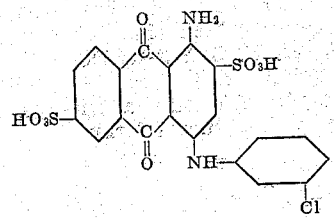

dyeing animal and related fibres in blue-reddish shades which are unchanged when exposed to artificial light.

4. The new dyestuff of the formula

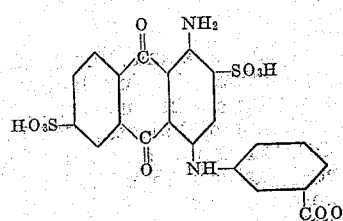

dyeing animal and related fibres in blue shades which are unchanged when exposed to artificial light.

5. A process for the manufacture of new dyestuffs of the anthraquinone series comprising the step of condensing an anthraquinone derivative of the general formula

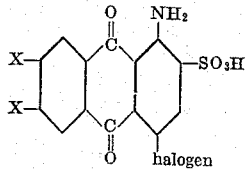

wherein halogen stands for a member of the group consisting of chlorine and bromine and wherein one X is a sulpho group, the other X being hydrogen, with an amine of the general formula

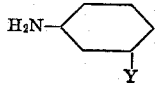

wherein Y stands for a substituent selected from the group consisting of halogen, alkyl and carboxy, esterified carboxy, hydroxy and alkoxy groups, in an aqueous medium in presence of copper as catalyst and of an acid binding agent.

6. The process for the manufacture of a new dyestuff of the anthraquinone series comprising the step of condensing the anthraquinone compound of the formula

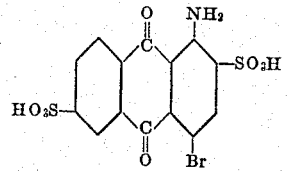

with m'-aminobenzoic acidmethylester in an aqueous medium in presence of copper as catalyst and of an acid binding agent.

7. The process for the manufacture of a new dyestuff of the anthraquinone series comprising the step of condensing the anthraquinone compound of the formula

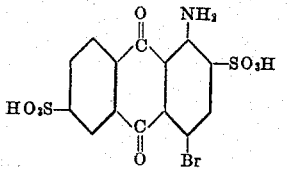

with m-toluidine in an aqueous medium in presence of copper as catalyst and of an acid binding agent.

SAMUEL VON ALLMEN.
HANS EGGENBERGER.

Certificate of Correction

Patent No. 2,412,790 December 17, 1946

SAMUEL von ALLMEN ET AL.

It is hereby certified that errors appear in the printed specification of the above numbered patent requiring correction as follows:

Column 2, line 35, for "4-dichloranthra-" read *4-dichloranthraquinone-*; column 4 last formula, left-hand portion thereof, for

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*